(12) United States Patent
Pieczul et al.

(10) Patent No.: US 8,909,933 B2
(45) Date of Patent: Dec. 9, 2014

(54) DECOUPLED CRYPTOGRAPHIC SCHEMES USING A VISUAL CHANNEL

(71) Applicant: International Business Machines Corporation, Armonk, NY (US)

(72) Inventors: Olgierd S. Pieczul, Dublin (IE); Mariusz Pajecki, Dublin (IE); Isabela Pogorzelska-Pieczul, Dublin (IE); Mary E. Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 13/660,852

(22) Filed: Oct. 25, 2012

(65) Prior Publication Data
US 2014/0122884 A1 May 1, 2014

(51) Int. Cl.
*H04L 29/06* (2006.01)
(52) U.S. Cl.
USPC .............................. 713/171; 713/168; 726/10
(58) Field of Classification Search
USPC .......................................................... 713/171
See application file for complete search history.

(56) References Cited

U.S. PATENT DOCUMENTS

| 8,024,576 | B2 | 9/2011 | Gargaro et al. | |
|---|---|---|---|---|
| 8,116,685 | B2 | 2/2012 | Bregman-Amitai et al. | |
| 2006/0196950 | A1 | 9/2006 | Kiliccote | |
| 2009/0110194 | A1 | 4/2009 | Athsani et al. | |
| 2009/0249077 | A1* | 10/2009 | Gargaro et al. | 713/183 |
| 2011/0219427 | A1* | 9/2011 | Hito et al. | 726/3 |
| 2013/0111208 | A1* | 5/2013 | Sabin et al. | 713/171 |
| 2013/0185210 | A1* | 7/2013 | Dodson et al. | 705/44 |
| 2014/0013107 | A1* | 1/2014 | Clair | 713/156 |

OTHER PUBLICATIONS

Dodson et al, "Secure, consumer-friendly web authentication and payments with a phone," Proceedings of the Second International ICST Conference on Mobile Computing, Applications, and Services (MobiCASE), Oct. 2010.
Potoczny-Jones, "Quick authentication using mobile devices and QR codes," http://corp.galois.com/blog/2011/1/5/quick-authentication-using-mobile-devices-and-qr-codes.html, Jan. 5, 2011.
Devries, "No Business Cards? How About Your QR code?" http://devriesblog.com/2010/03/08/no-business-cards-how-about-your-qr-code/, Mar. 8, 2010.
"Security QR Code," http://www.milliontech.com/home/content/view/254/139/ original publication date unknown, retrieved Sep. 2012.
"Encryption algorithm," http://stackoverflow.com/questions/4767897/encryption-algorithm, Jan. 22, 2011.

* cited by examiner

*Primary Examiner* — Yogesh Paliwal
(74) *Attorney, Agent, or Firm* — Jeffrey S. LaBaw; David H. Judson

(57) ABSTRACT

A visual data transfer channel is established between a mobile device and a computing entity to facilitate a decoupled cryptographic scheme. The mobile device stores a private key. In operation, a first code is received by the mobile device over the channel. The first code encodes a cryptographic value that secures other information that has been received or generated at the computing entity. The mobile device private key is then applied to the cryptographic value to generate a second cryptographic value, which is encoded to generate a second code. The second code is then rendered on the mobile device display, from which it can then be transmitted back over the visual channel to the computing entity. At the computing entity, the second cryptographic value is recovered from the second code.

24 Claims, 5 Drawing Sheets

DECOUPLED CRYPTOGRAPHIC SCHEMES USING A VISUAL CHANNEL

BACKGROUND OF THE INVENTION

1. Technical Field

This disclosure relates generally to information security and, in particular, to cryptography schemes that are implemented using mobile devices.

2. Background of the Related Art

The recent past has seen an enormous growth in the usage and capabilities of mobile devices, such as smartphones, tablets, and the like. Such devices comprise fast processors, large amounts of memory, gesture-based multi-touch screens, and integrated multi-media and GPS hardware chips. Many of these devices use open mobile operating systems, such as Android. The ubiquity, performance and low cost of mobile devices have opened the door for creation of a large variety of mobile applications.

User-oriented cryptography usage, both for confidentiality and integrity, has an intrinsic problem, namely, key storage. A user needs to keep the key safe, but the key also needs to be easily available to perform key-related operations. Keys may be kept on user's computer or on a special device, such as a smart card. Both solutions are not ideal and, as a consequence, performance of cryptographic operations often is difficult and may require special hardware (such as a smart card reader) that is often not installed.

A quick response (QR) code is a matrix barcode (or two-dimensional code), readable by QR scanners, mobile phones with a camera, and smartphones. QR code-based authentication for logging into a secure online account is well-known. In one such scheme, the user opens a web browser to a page that includes a QR code. The user scans the code with his or her mobile device, which triggers the appearance on the device's browser of a link to a web page. Once the link is followed to an account login page and the user enters his or her login credentials on the phone, the computer browser redirects the user to his or her logged-in account.

Mobile device-based authentication often relies on a private key stored on the device. It would be desirable to provide cryptographic schemes that enable use of such a private key while at the same time ensuring the integrity and confidentiality of the key. This disclosure addresses this need.

BRIEF SUMMARY

A visual data transfer channel is established between a mobile device and a computing entity (such as a machine, a laptop, an appliance, another mobile device, or the like) to facilitate a "decoupled" cryptographic scheme. Preferably, the channel comprises a camera and display of the mobile device interacting with a camera and display of the computing entity. The visual channel is associated with an application (e.g., email) executing on or in association with the computing entity, and it is assumed that some content associated with the application is adapted to be protected by a cryptography scheme. The mobile device stores a private key that is used for authentication.

A decoupled cryptographic operation according to this disclosure begins when a first code is received by the mobile device over the visual channel. The first code encodes a cryptographic value that secures other information (e.g., the application content) that has been received or generated at the computing entity. The mobile device private key is then applied to the cryptographic value to generate a second cryptographic value. The second cryptographic value is then encoded to generate a second code. Typically, the first and second codes are QR codes or some other code that is capable of being displayed on a mobile device display. The second code is then rendered on the mobile device display, from which it can then be transmitted back over the visual channel to the computing entity. At the computing entity, the second cryptographic value is recovered from the second code. The second cryptographic value is then applied at the computing entity to obtain access to the other information (by decryption), or to represent authenticity of the other information (as a digital signature).

Using this approach, the mobile device private key remains securely stored on the mobile device but is still useful to facilitate a cryptographic operation with respect to the computing entity.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
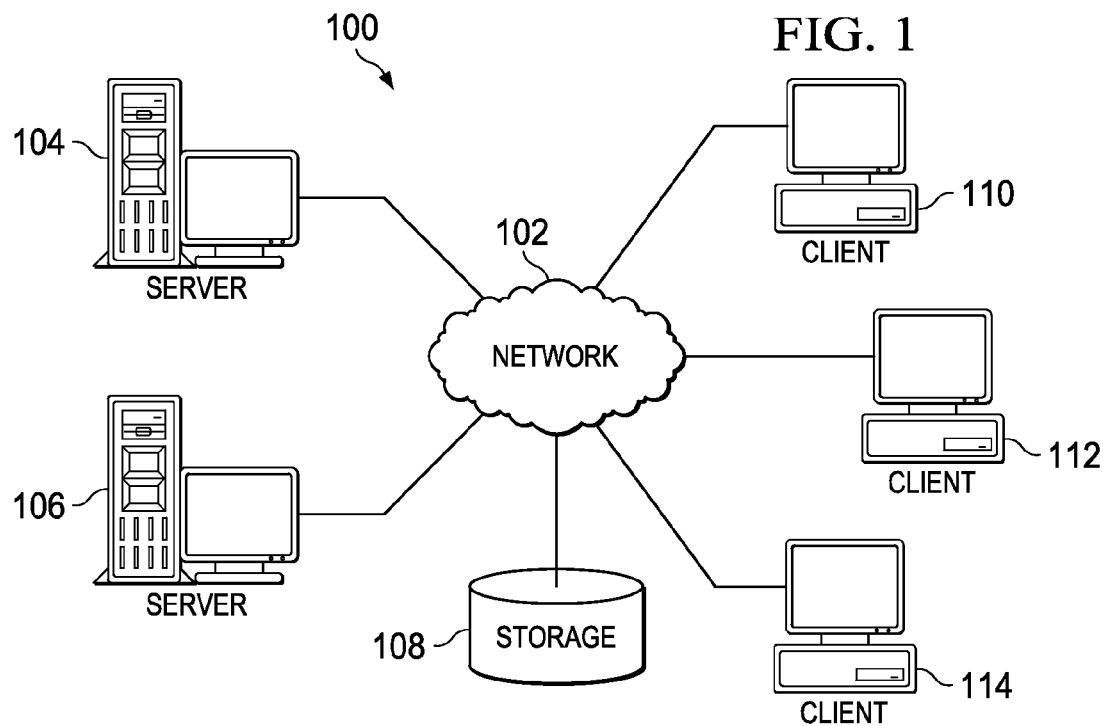
FIG. 1 depicts an exemplary block diagram of a distributed data processing environment in which exemplary aspects of the illustrative embodiments may be implemented.
Figure 2:
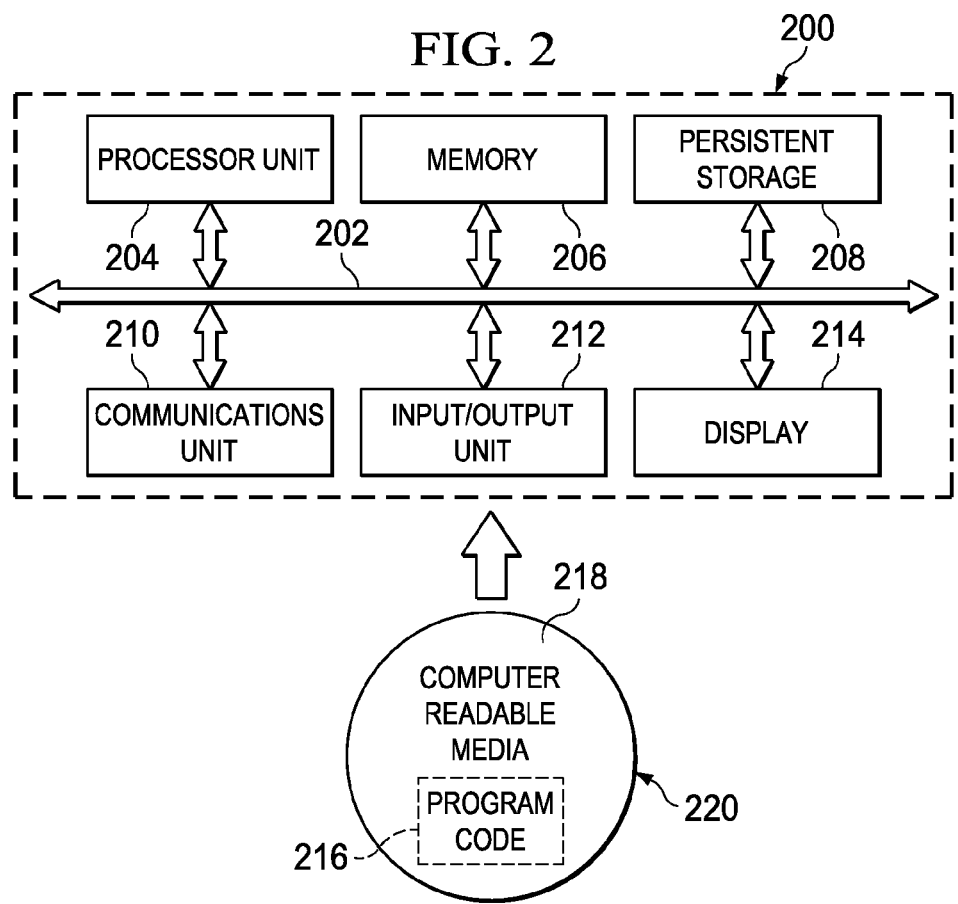
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

Figure 3:
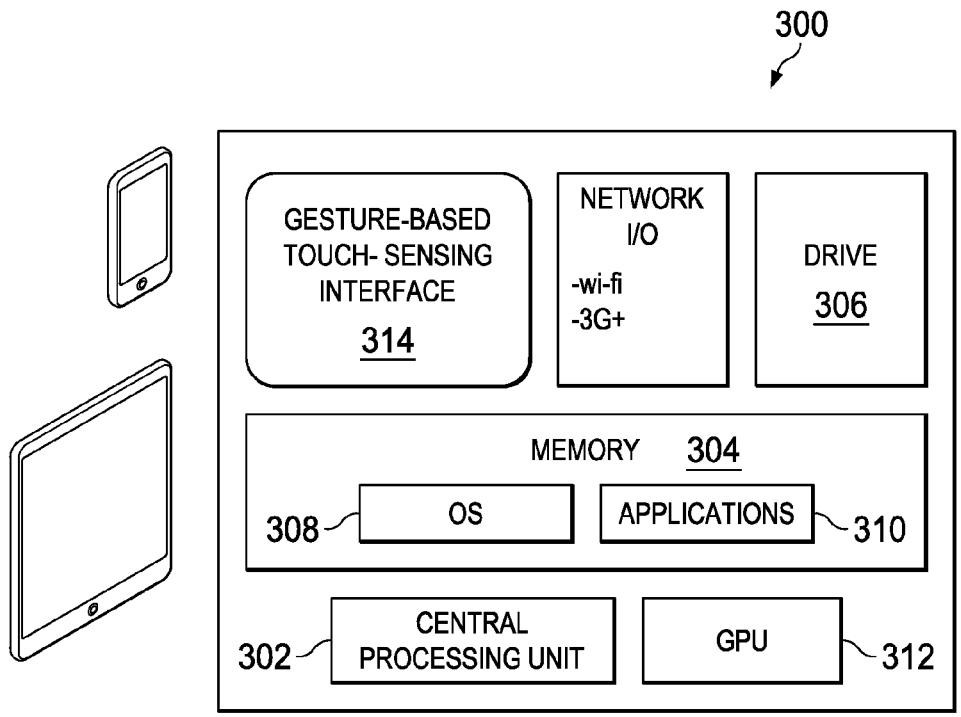
FIG. 3 illustrates a representative mobile device in which the disclosed subject matter may be implemented.

Mobile device technologies also are well-known. A mobile device is a smartphone or tablet, such as the iPhone® or iPad®, an Android™-based mobile device, or the like. As seen in FIG. 3, a device 300 of this type typically comprises a CPU 302, computer memory 304, such as RAM, and a data store 306. The device software includes operating system (e.g., Apple iOS, Android, Blackberry OS, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards, cameras, microphones, and the like.

More generally, the mobile device is any wireless client device, e.g., a cellphone, pager, a personal digital assistant (PDA, e.g., with GPRS NIC), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Thus, a mobile device as used herein is a 3G-(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Mobile Device-Based Decoupled Cryptography Schemes Using a Visual Channel

With the above as background, the subject matter of this disclosure is now described.

Figure 4:
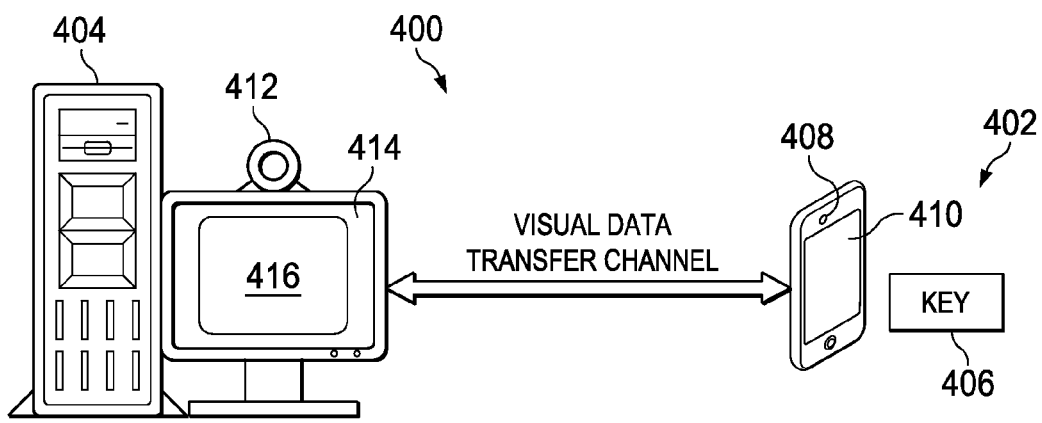
FIG. 4 illustrates a visual data transfer channel established between the mobile device of FIG. 3 and a computing entity, such as the data processing system shown in FIG. 2.

Referring to FIG. 4, the basic concept of this disclosure is shown. According to this disclosure, a visual data transfer channel 400 is established between a camera- and display-enabled mobile device 402, and a computing entity 404, such as a machine, a laptop, an appliance, another mobile device, a server-side application, or the like. This channel is used to facilitate a decoupled cryptographic scheme. A decoupled cryptographic scheme is one in which at least one operation associated with the scheme occurs on one side of the data transfer channel, while at least one related operation associated with the scheme occurs on the other side of the data transfer channel. A cryptographic scheme of this type may also be referred to as a "divided" or "split" scheme or, more generally, a cryptographic primitive. As will be described, typically the cryptographic scheme is a lower level operation that underlies a higher level security service, such as an authentication service, a digital signature service, or the like. This is not a limitation, however.

A representative mobile device is one shown in FIG. 3, and a representative computing entity is one shown in FIG. 2. The mobile device 402 stores a private key 406, such as a decryption key, that is desired to remain secure on the mobile device but that is also adapted for some cryptographic function that is necessary on or in association with the computing entity 404. As will be seen, by using the visual data transfer channel 400, the mobile device private key 406 remains securely stored on the mobile device, but is it also used to facilitate an operation (e.g., an authentication) with respect to the computing entity 404.

In one embodiment, and as shown in FIG. 4, the visual data transfer channel 400 comprises a camera 408 and a display 410 of the mobile device 402 interacting with a camera 412 and a display 414 of the computing entity. The visual channel 400 is associated with an application 416 (e.g., email) executing on or in association with the computing entity 404, and it is assumed that some content associated with the application is adapted to be protected by a cryptography scheme. As noted above, the mobile device 402 stores the private key 406 that is used for the higher level service.

Figure 5:
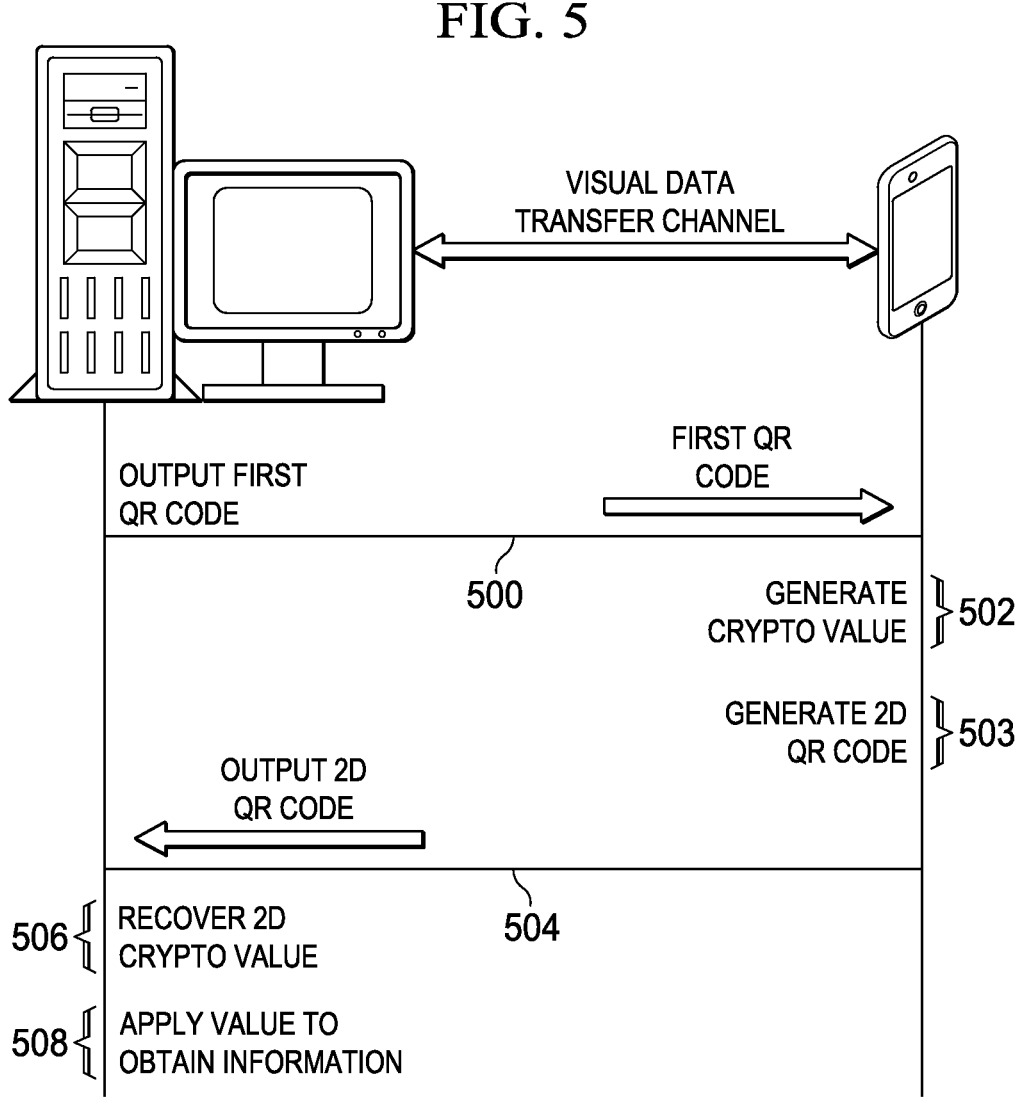
FIG. 5 illustrates the basic operation of the visual data transfer channel of this disclosure in which a private key value stored in the mobile device is used to facilitate a cryptographic operation associated with the computing entity without leaving the mobile device.

The basic operation of the visual data transfer channel to facilitate a decoupled cryptographic scheme is described in the process flow in FIG. 5. The operation begins at step 500 when a first code is received by the mobile device over the visual channel. The first code encodes a cryptographic value that secures other information (e.g., the application content) that has been received or generated at the computing entity. At step 502, the mobile device private key is then applied to the cryptographic value to generate a second cryptographic value. The second cryptographic value is then encoded at step 503 to generate a second code. Typically, the first and second codes are QR codes or some other code that is capable of being displayed on a mobile device display. At step 504, the second code is then rendered on the mobile device display, from which it can then be (or is) transmitted back over the visual channel to the computing entity. At the computing entity, the second cryptographic value is recovered from the second code. This is step 506. At step 508, the second cryptographic value is then applied at the computing entity to obtain access to the other information (by decryption), or to represent authenticity of the other information (as a digital signature). This completes the process.

Figure 6:
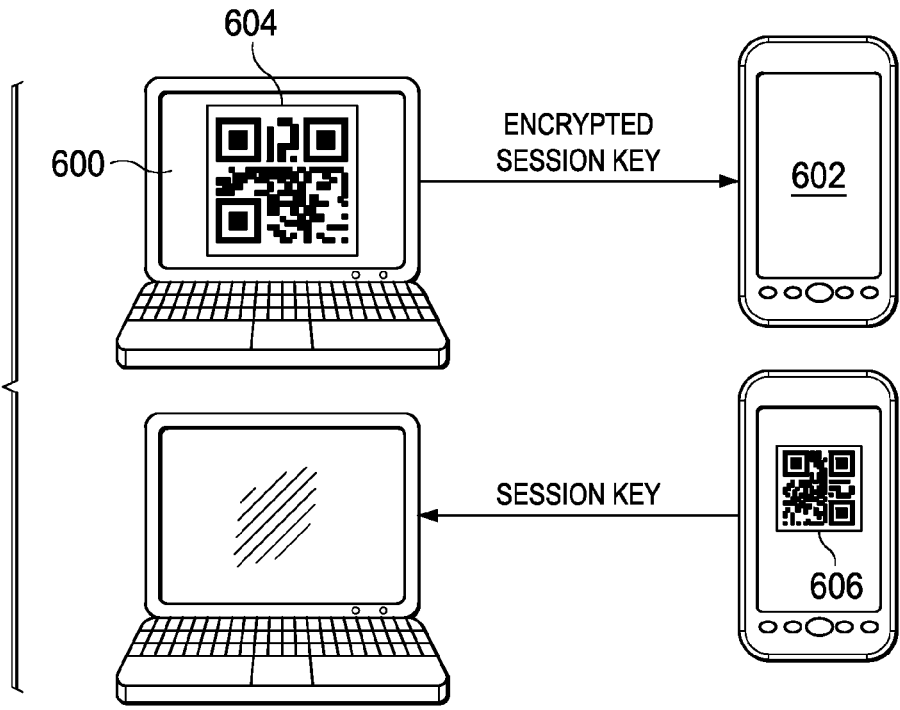
FIG. 6 illustrates how the private key stored on the mobile device can be used to facilitate an encryption operation on the computing entity.

FIG. 6 illustrates how the approach is used for encryption. In this example, it is assumed that Alice (not shown) has sent an encrypted message to Bob. Bob has a laptop 600 and a mobile device 602 that stores the private key needed to decrypt the message sent by Alice. Thus, in this example, it is assumed that the message is encrypted with a symmetric cipher (e.g., AES) with a session key generated randomly. The session key is encrypted with Bob's public key, and Bob will need his private key (stored on the mobile device 602) to decrypt the session key. As shown in FIG. 6, Bob receives the encrypted message (the ciphertext) and the encrypted session key, e.g., by email. Decryption software executing on Bob's laptop then presents the encrypted session key as a QR code 604 on Bob's laptop screen. The QR code (the encrypted session key) is then read from the laptop display using a front-facing camera of the mobile device (such as a smartphone). This is the top portion of the drawing. Software executing on Bob's smartphone reads the encrypted session key (the QR code) and decrypts it with the private key stored on Bob's mobile device. Bob's smartphone then renders back a decrypted session key as another QR code 606. The second code is rendered on the display of the mobile device, as indicated in the bottom portion of the drawing. Bob's laptop includes (or has an associated) camera that scans the QR code rendered by the mobile device. The software executing on the laptop then recovers the cryptographic value encoded in the QR code 606 and uses it to decrypt the original message, which is now available to Bob's laptop in the clear. The process can be carried out reliably and efficiently over the visual authentication channel and without requiring the private key to leave the mobile device.

Figure 7:
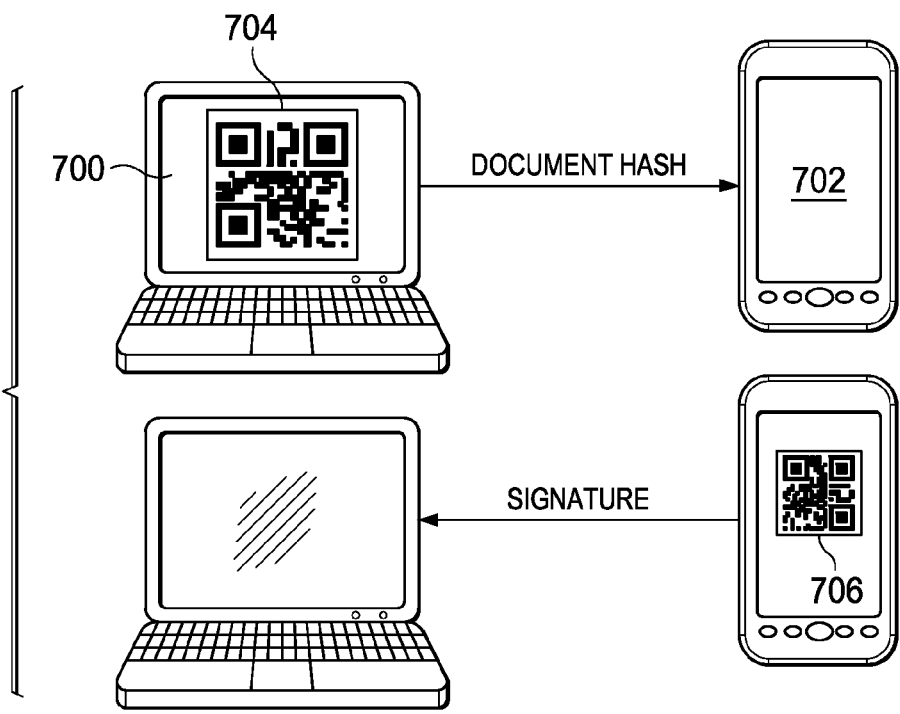
FIG. 7 illustrates how the private key stored on the mobile device can be used to facilitate a digital signature scheme on the computing entity.

FIG. 7 illustrates how the approach is used for digital signing. In this example embodiment, the private key (stored on the mobile device) is used to sign (create a digital signature) of the hash (e.g., computed by a hash function such as MD5, SHA-1 or the like) of a message, such as an email. In this example scenario, Alice desires to send a signed email to Bob (not shown), and Alice has both a laptop 700 and a mobile device 702. Email software executing on Alice's laptop 700 computes a hash of her email and renders its QR code representation 704 on the laptop display screen. Alice then takes her mobile device and scans the encoded hash, as indicated in the top portion of the drawing. Digital signature software executing on Alice's smartphone encrypts the received email hash using the private key stored on that device; this operation generates a digital signature in the form of a second QR code 706. As indicated in the bottom portion of the drawing, Alice's mobile device renders the QR code (the signature), which is then scanned by a camera (e.g., a web cam) on Alice's laptop. The email program executing on Alice's laptop then attaches the received signature to the outgoing email and sends the email to Bob to complete the process.

The operations described above with respect to FIG. 6 and FIG. 7 may be carried out as part of the underlying application (e.g., the email application), or as a separate function or operation by other software dedicated to implementing and supporting the visual authentication channel. Of course, while the example scenarios involve email messages, this is not a limitation, as the techniques herein may be implemented with respect to any computing entity application that requires a cryptographic operation that is facilitated with the mobile device-resident private key. Further, the disclosed technique may be used with any form of cryptographic scheme (including, without limitation, encryption/decryption, digital signature generation and verification, message validation, and the like) in which a private key is maintained on the mobile device but required to be used (on another machine) in association with a cryptographic protocol.

While QR codes are preferred, the visual data transfer channel may use any other two-dimensional (2D) code that is adapted to be displayed and read from a visual display. Other 2D codes include, without limitation, data matrix codes, 2D tag codes, and the like. More generally, the decoupled cryptographic schemes of this disclosure may be implemented with any codes that are encoded for visual transmission in the mobile environment.

Further, while the mobile device is shown storing a private key, one skilled in the art will appreciate that the same approach may be used to secure (on the mobile device) any data string of value yet still enable that data string to be used in some computational manner with respect to an application executing remotely from that mobile device. In this approach, the use of the visual authentication channel ensures that the mobile device-resident data string remains securely stored on the mobile device but is still useful to facilitate some other operation with respect to the computing entity application.

Figure 8:
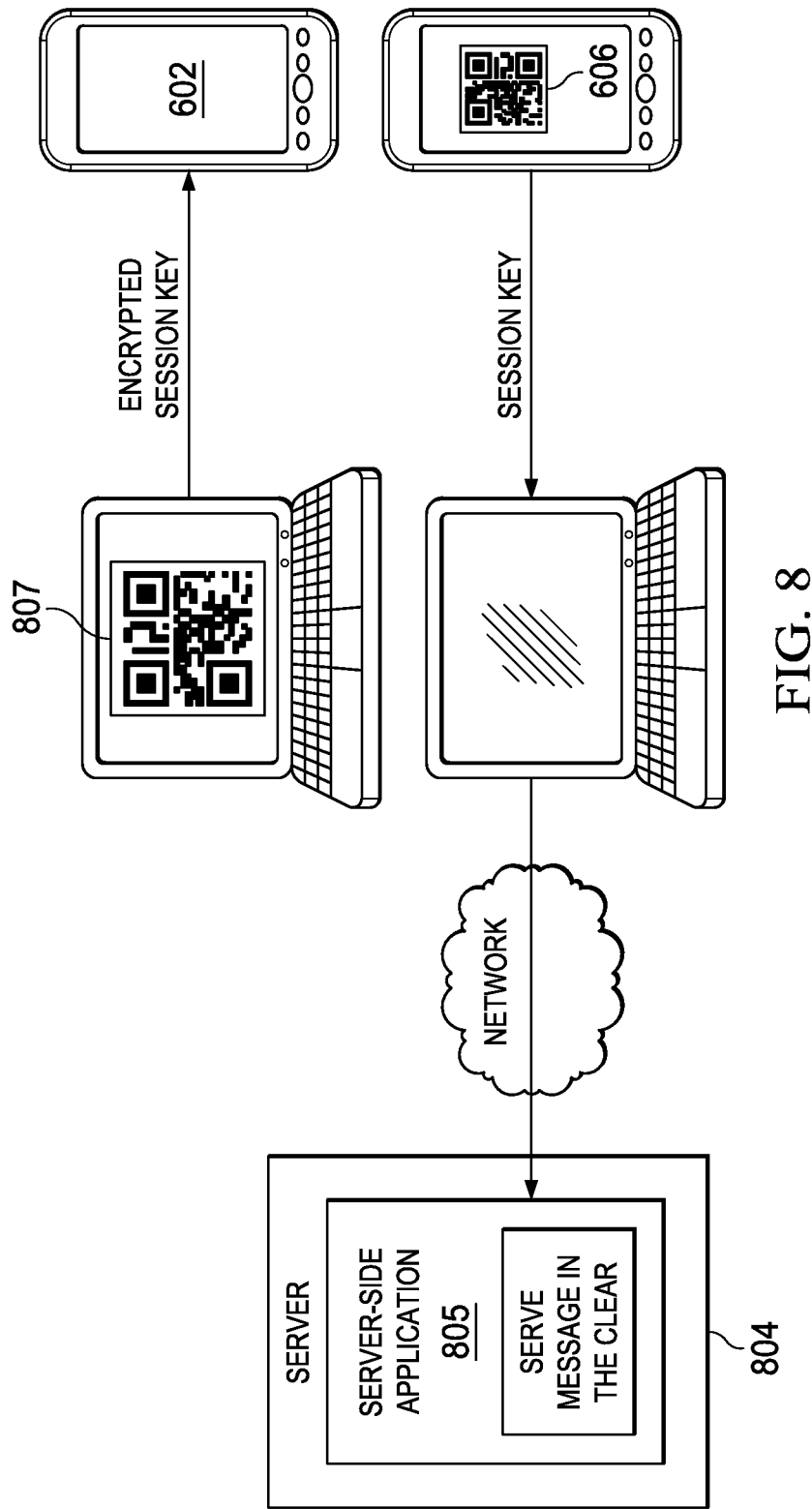
FIG. 8 illustrates an alternative embodiment wherein the computing entity is distributed and a server-side application uses the cryptographic information generated at the mobile device.

In an alternative embodiment, such as shown in FIG. 8, the computing entity itself is "distributed" among multiple components. In this example, the mobile device communicates with a server-side (e.g., a cloud-based) application running remotely (from both the user's computer and his/her mobile device, and via the intermediary of the client-side of the application that executes on the user's desktop computer or laptop and that is local to the user (and his/her mobile device). The client-side of the application may be a rich client application, or even just a set of one or more pages that are displayed in a web browser. Thus, as illustrated in FIG. 8, the computing entity comprises, as one component, a server 804 that host the server side 805 of a client-server application (such as a webmail application). The client side 807 of the application executes as a second component of the computing entity, in this example as one or more web pages that are displayed in the display. As an example operation, assume that the client-server application is a webmail application (which, once again, should not be taken as limiting). In this scenario, and in contrast to that shown in FIG. 6, it is desired that the server-side of the webmail application (not the user's laptop) that receives the encrypted message (from Alice, not shown). In this scenario, Bob logs in to his webmail application using a conventional web browser-based logon. The webmail application indicates to Bob that an encrypted message has been received. As before, the message is encrypted with a cipher (e.g., symmetric AES) with a session key generated randomly. The session key is encrypted with Bob's public key. The webmail client running on the laptop receives the encrypted session key and presents it as a QR code on Bob's local display screen (e.g., using Flash, as an image, or the like). Once again, Bob scans the presented QR code with him mobile device, which then decrypts it with the mobile device-resident private key. Bob's mobile device then renders back a second QR code that represents the decrypted session key. The webmail application running on the local machine then uses accesses a camera (e.g., a web cam) associated with the local machine to obtain the decrypted session key. This data is then posted (e.g., via an HTTP POST) to the server-side of the application, where it is used to decrypt the message. The decrypted message is then served to Bob's browser (e.g., as a web page, or in a web page), where it is viewable by Bob in the clear.

The above example illustrates how the visual channel between the mobile device and a server-side application can be established, preferably using the intermediary browser's existing capabilities. In this manner, the QR code image is served from the server-side application. The approach does not require any additional software (other than perhaps standard browser plug-ins).

The subject matter described herein has significant advantages over the prior art. The approach enables private key-related operations required by an application to be performed on a mobile device without ever requiring that key to leave the device. This significantly reduces the risk of compromising the private key, e.g., through compromise of the user's computer (the computing entity). The visual channel takes advantage of embedded hardware and software resources (e.g., cameras, webcams, plug-ins and interfaces) that are now ubiquitous on today's mobile devices and computers. Thus, the approach can be implemented at low cost. The visual channel as herein described also enables users to easily perform cryptographic operations on different machines using the same private key but without having to install the key on one or more of the machines. The approach is also advantageous because it does not require the user to hold any other device (e.g., a smart card) or token, other than the user's mobile device. By using a visual authentication channel, the coupling between the mobile device and the computing entity is data-driven, instead of an API, thus broadening the use cases that may be implemented using the technique. Moreover, and because the technique obviates smart cards or the like that had been used to store such keys in the past, the approach also frees up those interfaces for other tasks. The approach provides a more reliable and secure approach for encryption and digital signing that is easy to use.

As also noted, the technique may be used for many different types of applications including, without limitation, email applications, document sharing applications, and other web- or cloud-based applications. Indeed, the approach may be leveraged whenever it is required to maintain a data string securely on a mobile device yet enable that data string to be used for a computation in a computing entity remote from the mobile device.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the functionality on each of the two sides of the visual authentication channel is implemented in software, which includes but is not limited to firmware, resident software, microcode, and the like. As noted above, these functions may be integrated into other applications (such as webmail, document sharing, or the like), or built into software for this specific purpose (of facilitating the visual data exchange channel). Furthermore, the device-specific functionality on either side of the channel can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer-readable storage medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The mobile device is not limited to any particular device, configuration, or functionality. The techniques may be practiced in any device (distinct from the computing entity) and that is adapted or configured for the purpose of maintaining the key value securely and enabling access to that value using the visual data transfer channel in the manner described above.

Having described our invention, what we now claim is as follows.

The invention claimed is:

1. A cryptographic method, operative in a mobile device that stores a private key, the mobile device having a display, comprising:
receiving, over a visual channel established between the mobile device and a computing entity, a first code, the first code encoding a cryptographic value that secures other information;
applying the private key to the cryptographic value to generate a second cryptographic value;
encoding the second cryptographic value to generate a second code, the second cryptographic value being recoverable from the second code at the computing entity; and
outputting the second code over the visual channel to the computing entity.

2. The method as described in claim 1 wherein the visual channel is implemented by a camera and display of the mobile device interacting with a camera and display of the computing entity.

3. The method as described in claim 1 wherein the first code and the second code are codes that encode information for visual transmission.

4. The method as described in claim 3 wherein the codes are QR codes.

5. The method as described in claim 1 wherein the computing entity is one of: a machine, a laptop, an appliance, a device, and an application executing thereon.

6. The method as described in claim 1 wherein the second cryptographic value is useful to obtain access to the other information.

7. The method as described in claim 1 wherein the second cryptographic value is useful to represent authenticity of the other information.

8. A cryptographic method, operative in a computing entity, in association with a mobile device that stores a private key, comprising:
transmitting, over a visual channel established between the mobile device and the computing entity, a first code, the first code encoding a cryptographic value that secures other information;
receiving, over the visual channel, a second code, the second code having been generated at the mobile device by applying the private key to the cryptographic value to generate a second cryptographic value and encoding the second cryptographic value;
recovering the second cryptographic value from the second code; and
applying the second cryptographic value to the cryptographic value.

9. The method as described in claim 8 wherein the second cryptographic value is a decryption key and the applying step decrypts the cryptographic value.

10. The method as described in claim 8 wherein the second cryptographic value is a signature and the applying step generates a digital signature.

11. The method as described in claim 8 wherein the visual channel is implemented by a camera and display of the mobile device interacting with a camera and display of the computing entity.

12. The method as described in claim 8 wherein the applying step comprises forwarding the second cryptographic value to a server-side application, the server-side application applying the second cryptographic value to obtain the other information.

13. The method as described in claim 12 further including:
receiving the other information from the server-side application; and
outputting the other information.

14. Mobile device apparatus associated with a distinct computing entity, comprising:
a processor; and
computer memory holding a private key and computer program instructions that when executed by the processor perform a cryptographic scheme, the computer program instructions comprising:
code to receive, over a visual channel established between the mobile device and the computing entity, a first code, the first code encoding a cryptographic value that secures other information;
code to apply the private key to the cryptographic value to generate a second cryptographic value;
code to encode the second cryptographic value to generate a second code, the second cryptographic value adapted to be recoverable from the second code at the computing entity to facilitate securing the other information; and
code to output the second code over the visual channel to the computing entity.

15. The apparatus as described in claim 14 wherein the visual channel comprises a camera and display of the mobile device.

16. The apparatus as described in claim 14 wherein the first code and the second code are codes that encode information for visual transmission.

17. The apparatus as described in claim 16 wherein the codes are QR codes.

18. A computer program product in a non-transitory computer readable storage medium for use operative in a computing entity, in association with a mobile device that stores a private key, the computer program product holding computer program instructions which, when executed, perform a cryptographic method comprising:
transmitting, over a visual channel established between the mobile device and the computing entity, a first code, the first code encoding a cryptographic value that secures other information;
receiving, over the visual channel, a second code, the second code having been generated at the mobile device by applying the private key to the cryptographic value to generate a second cryptographic value and encoding the second cryptographic value;
recovering the second cryptographic value from the second code; and
applying the second cryptographic value to the cryptographic value.

19. The computer program product as described in claim 18 wherein the second cryptographic value is a decryption key and the applying step decrypts the cryptographic value.

20. The computer program product as described in claim 18 wherein the second cryptographic value is a signature and the applying step generates a digital signature.

21. The computer program product as described in claim 18 wherein the applying step comprises forwarding the second cryptographic value to a server-side application associated with the computing entity, the server-side application applying the second cryptographic value to obtain the other information.

22. The computer program product as described in claim 21 wherein the method further includes:
receiving the other information from the server-side application; and
outputting the other information.

23. The computer program product as described in claim 18 wherein the first code and the second code are codes that encode information for visual transmission.

24. The computer program product as described in claim 23 wherein the codes are QR codes.

* * * * *